United States Patent [19]
Georg Härtel

[11] Patent Number: 5,038,675
[45] Date of Patent: Aug. 13, 1991

[54] COFFEE OR TEA MAKER

[75] Inventor: Georg Härtel, Minden, Fed. Rep. of Germany

[73] Assignee: Melitta-Werke Bentz & Sohn, Minden, Fed. Rep. of Germany

[21] Appl. No.: 453,283

[22] Filed: Dec. 22, 1989

[30] Foreign Application Priority Data

Dec. 28, 1988 [DE] Fed. Rep. of Germany ....... 3844091

[51] Int. Cl.$^5$ ............................................. A47J 31/06
[52] U.S. Cl. .......................................... 99/286; 99/306
[58] Field of Search ................. 99/279, 280, 300, 304, 99/295, 306, 305, 286, 290, 284; 426/433

[56] References Cited

U.S. PATENT DOCUMENTS 3,844,206 10/1974 Weber ..................................... 99/300
4,889,041 12/1989 Mahlich ................................. 99/286

Primary Examiner—Robert W. Jenkins
Attorney, Agent, or Firm—Spencer & Frank

[57] ABSTRACT

A coffee or tea maker has a fresh water container with an outlet opening into a flowthrough heater. There is a water filter for filtering the water used for brewing the coffee or tea. A recess is formed in the fresh water container that is configured to receive the water filter. The water filter is replaceable, and can be inserted into the recess from the upper side of the fresh water container.

8 Claims, 1 Drawing Sheet

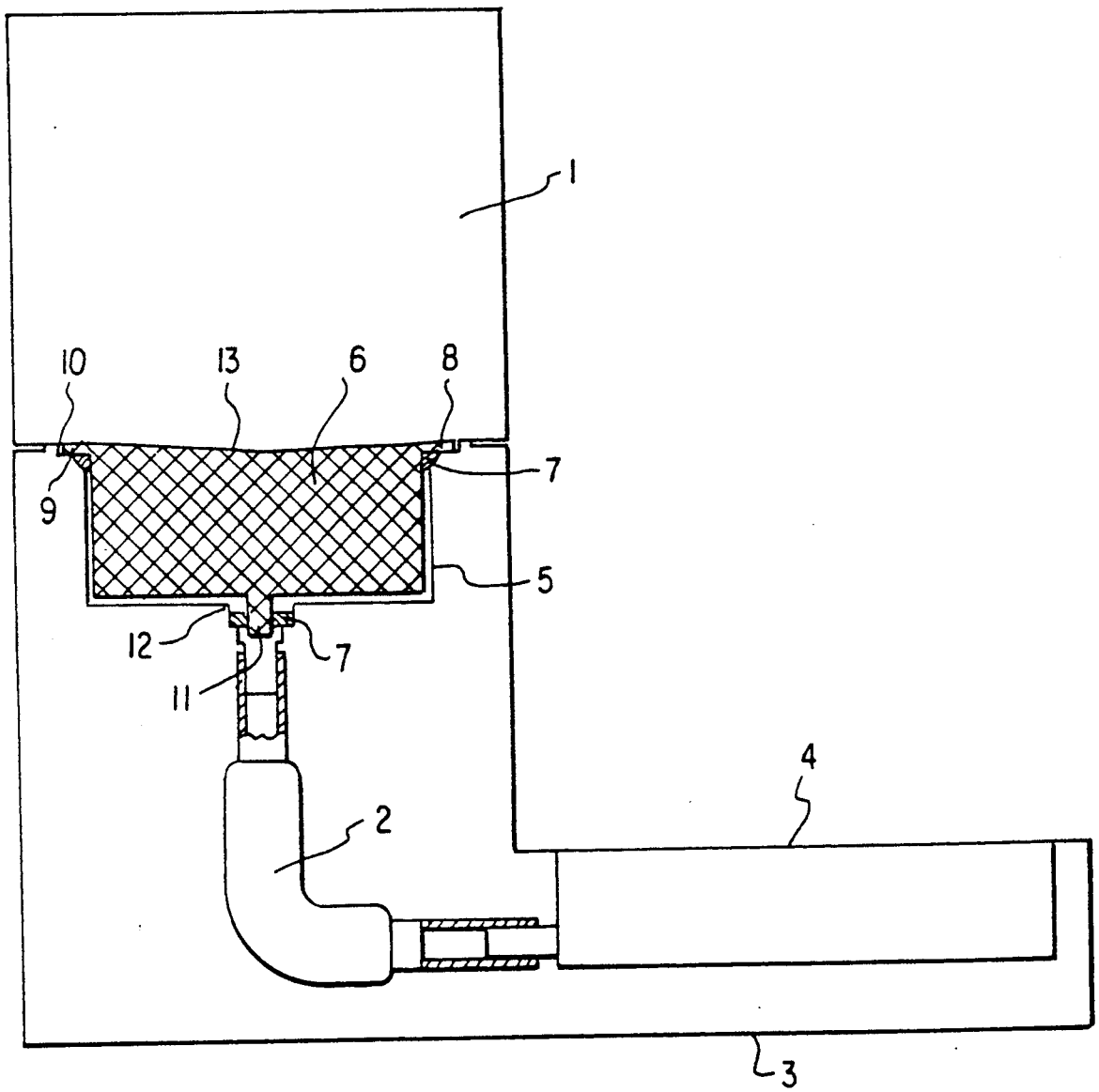

COFFEE OR TEA MAKER

BACKGROUND OF THE INVENTION

1. FIELD OF THE INVENTION

The present invention relates to a coffee ot tea maker including a fresh water container, whose outlet opens into a flowthrough heater, and a water filter.

2. BACKGROUND ART

In order to improve the quality of brewed beverages made from coffee or tea, it is often necessary to filter the fresh water obtained from the water supply system.

Coffee or tea makers of this type have therefore already been equipped with water filters.

In that regard, the integration of a water filter in a coffee or tea maker has involved complicated and, consequently, expensive construction.

SUMMARY OF THE INVENTION

It is the object of the present invention to configure a coffee or tea maker of an above-mentioned type so that the integration of a water filter in the coffee ot tea maker is simple, cost-effective and possible without significant changes in the technology of such a coffee or tea maker.

This is accomplished according to the invention by inserting a water filter into a recess configured to the outline of the water filter and disposed in the outlet region of the fresh water container. The water filter is sealed by way of one or more seals against the walls of the recess. The basic surface of the water filter and, accordingly, the basic surface of the recess is smaller than the basic surface of the fresh water container.

Such a structure can be realized easily and without problems since, in contrast to coffee or tea makers without water filters, only the outlet region of the fresh water container is reenginered for receiving the water filter.

The arrangement and structure of the remaining components of such a coffee or tea maker can remain unchanged.

The water filter itself can be inserted, without problems, from the upper side of the fresh water container. By sealing the water filter against the recess walls, the water disposed in the fresh water container enters the subsequently connected flowthrough heater exclusively by passing through the water filter.

Further features of the invention will be apparent from the detailed description below.

One embodiment of the invention is illustrated in the attached drawing figure, in which:

The FIGURE is a side view of the coffee or tea maker of the invention, partially broken away for clarity.

DETAILED DESCRIPTION OF THE PREFERRED EMBODIMENTS

The sole drawing FIGURE is a schematic illustration of a coffee or tea maker according to the invention that is shown partially in section.

The reference numeral 1 in the drawing identifies the fresh water container of a coffee or tea maker.

This fresh water container 1 is followed by a fluidly connected known flowthrough heater 2, and a warming plate 4 is integrated in the base 3 of the coffee or tea maker.

The coffee or tea filtering device and a collection vessel for a filtered beverage produced in this coffee or tea maker are not shown as these components are readily understood in connection with the present invention.

As can be clearly seen in the drawing, the outlet region of the fresh water container 1 has a shaped-on or integrally formed recess 5 whose outline is configured to mate with the outline of a water filter 6 inserted into recess 5.

Water filter 6 is sealed against the recess walls by two seals 7.

On its upper end region facing fresh water container 1, water filter 6 has a laterally projecting, circumferential edge 8 which rests on the flanks 9 of a correspondingly shaped step 10 provided in the transition region between the usable fill area of fresh water container 1 and recess 5.

On its underside facing away from fresh water container 1, water filter 6 has a projecting element 11 which passes through a discharge pipe 12 integrally formed with the underside of recess 5. As can be seen clearly in the drawing, the seal between water filter 6 and recess 5 is effected by the already mentioned seals 7, in the region of circumferential contact edge 8 or in the region between projecting element 11 and discharge pipe 12.

In this way, water in fresh water container 1 is effectively prevented from entering flowthrough heater 2 without passing through water filter 6.

At its upper side facing fresh water container 1, water filter 6 is provided with a conical or recess-like depression 13 which enhances the complete and definite discharge of the water contained in fresh water container 1.

Water filter 6, similar to recess 5, has a base surface, which is smaller than that of fresh water container 1. Thus a user easily inserts water filter 6 into recess 5, from the upper side of fresh water container 1.

Water filter 6 is advantageously removably inserted into recess 5 of fresh water container 1 so as to be exchangeable with another water filter 6.

Fresh water container 1 and recess 5 together with discharge pipe 12 are preferably manufactured in one piece from plastic or glass.

With the above-described, easily realized structure which is easily manipulated by the user if becomes possible, without major changes in the basic technology of coffee or tea makers as they are predominantly found in households, to reliably filter the water used for making coffee or tea.

The foregoing is a complete description of a preferred embodiment of the present invention. Numerous changes may be made without departing from the spirit and scope of the present invention. The invention, therefore, should be limited only by the following claims.

I claim:

1. A coffee or tea maker, comprising:
   a fresh water container having a base surface;
   means defining a recess in said fresh water container;
     said recess having a base surface formed by a part of the base surface of said fresh water container; and a step defined on an upper part of said means defining said recess;
   means defining an outlet in the base surface of said recess;
   a water filter received in said recess and having substantially the same configuration as said recess for mating therewith, whereby said water filter covers said outlet; and a laterally projecting circumferential contact flange on said water filter engaging said step when said filter is received in said recess; and a flowthrough heater attached to said outlet for heating water filter by said filter.

2. A coffee or tea maker according to claim 1, further comprising a seal disposed between said water filter and said means defining said recess.

3. A coffee or tea maker according to claim 1, wherein said fresh water container is disposed above said water filter, and further comprising a conical recessed depression on an upper side of the water filter facing said fresh water container.

4. A coffee or tea maker according to claim 1, further comprising means for detachably receiving said water filter in said recess.

5. A coffee or tea maker, comprising:

a fresh water container having a base surface;

means defining a recess in said fresh water container; said recess having a base surface formed by a part of the base surface of said fresh water container;

means defining an outlet in the base surface of said recess;

a water filter received in said recess and having substantially the same configuration as said recess for mating therewith, whereby said water filter covers said outlet;

a flowthrough heater attached to said outlet for heating water filtered by said filter;

a discharge pipe connecting said recess and said flowthrough heater; and a projecting element on an underside of said water filter facing away from said fresh water container and passing through said discharge pipe.

6. A coffee or tea maker according to claim 5, further comprising a seal disposed between said water filter and said means defining said recess.

7. A coffee or tea maker, comprising:

a fresh water container having a base surface;

means defining a recess in said fresh water container; said recess having a base surface formed by a part of the base surface of said fresh water container; a step defined on an upper part of said means defining said recess;

means defining an outlet in the base surface of said recess;

a water filter received in said recess and having substantially the same configuration as said recess for mating therewith, whereby said water filter covers said outlet; a laterally projecting circumferential contact flange on said water filter engaging said step when said filter is received in said recess;

a flowthrough heater attached to said outlet for heating water filtered by said filter;

a discharge pipe connecting said recess and said flowthrough heater; and a projecting element on an underside of said water filter facing away from said fresh container and passing through said discharge pipe.

8. A coffee or tea maker according to claim 1, further comprising a seal disposed between said water filter and said means defining said recess; and seals disposed between said circumferential contact flange and said step and between said discharge pipe and said projecting element.

* * * * *